(12) United States Patent
Akinlua et al.

(10) Patent No.: US 11,479,310 B2
(45) Date of Patent: Oct. 25, 2022

(54) TRACK CHAIN AND METHODS FOR BUSHING ROTATION

(71) Applicant: Caterpillar Inc., Deerfield, IL (US)

(72) Inventors: Temitope O. Akinlua, Peoria, IL (US); David J. Hakes, Princeville, IL (US); Michael D. Hasselbusch, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 688 days.

(21) Appl. No.: 16/360,351

(22) Filed: Mar. 21, 2019

(65) Prior Publication Data

US 2020/0298920 A1 Sep. 24, 2020

(51) Int. Cl.
*B62D 55/32* (2006.01)
*B62D 55/21* (2006.01)
*B62D 55/28* (2006.01)

(52) U.S. Cl.
CPC ............ *B62D 55/32* (2013.01); *B62D 55/21* (2013.01); *B62D 55/213* (2013.01); *B62D 55/28* (2013.01)

(58) Field of Classification Search
CPC .... B62D 55/21; B62D 55/211; B62D 55/213; B62D 55/28; B62D 55/32
See application file for complete search history.

(56) References Cited

U.S. PATENT DOCUMENTS

| | | | |
|---|---|---|---|
| 3,717,389 A | 2/1973 | Boggs et al. | |
| 3,822,923 A * | 7/1974 | Stedman | B62D 55/213 305/186 |
| 4,050,141 A | 9/1977 | Vanlandingham et al. | |
| 4,128,932 A | 12/1978 | Vanlandingham et al. | |
| 4,149,758 A * | 4/1979 | Livesay | B62D 55/0887 305/100 |
| 4,187,744 A | 2/1980 | Livesay | |
| 5,887,958 A * | 3/1999 | Bissi | B62D 55/211 305/201 |
| 6,783,196 B2 * | 8/2004 | Maguire | B62D 55/0887 305/186 |
| 6,866,351 B2 | 3/2005 | Yamamoto | |
| 7,877,977 B2 | 2/2011 | Johannsen | |
| 8,272,701 B2 | 9/2012 | Mulligan | |
| 8,851,583 B2 | 10/2014 | Grenzi | |
| 10,322,760 B2 * | 6/2019 | Trone | B62D 55/28 |
| 10,633,042 B2 * | 4/2020 | Trone | B62D 55/21 |

(Continued)

FOREIGN PATENT DOCUMENTS

| | | |
|---|---|---|
| JP | 2008018795 | 1/2008 |
| WO | 2008113264 | 9/2008 |

*Primary Examiner* — Kip T Kotter
*Assistant Examiner* — Emily G. Castonguay
(74) *Attorney, Agent, or Firm* — Schwegman, Lundberg & Woessner

(57) ABSTRACT

A method of servicing a track chain assembly includes loosening a fastener to reduce a clamping force of a track link body on a track bushing. With the clamping force reduced, the method includes rotating the track bushing from a first position wherein a worn side of the track bushing faces a drive sprocket to a second position wherein an unworn side of the track bushing faces the drive sprocket. Once the track bushing in the second position, the method includes tightening the fastener to increase the clamping force on the track bushing. The method can be performed while leaving the track chain in place on a track machine.

20 Claims, 8 Drawing Sheets

(56) References Cited

U.S. PATENT DOCUMENTS

| | | |
|---|---|---|
| 2010/0146925 A1 | 6/2010 | Johannsen et al. |
| 2012/0153715 A1* | 6/2012 | Tsubaki ............ B62D 55/0887 305/100 |
| 2018/0281880 A1 | 10/2018 | Trone et al. |

* cited by examiner

TRACK CHAIN AND METHODS FOR BUSHING ROTATION

TECHNICAL FIELD

The present disclosure is directed generally, but not by way of limitation, to a track chain for track type machines, and more particularly, to servicing bushings of a track chain.

BACKGROUND

Earth moving, construction and mining equipment and the like are often used in rough, off-road terrain. These machines often employ an endless drive in a track type machine that is able to propel the machines over obstacles and uneven terrain. The endless drive in track type machines typically utilize track chains (hereinafter chains) on either side of the machine that are connected to surface engaging elements, known as track shoes, to move the machine. The chains, including the shoes, are held together by a series of interconnected track links, pins and bushings that are supported on a drive sprocket, idler and support rollers. As the chain translates, the track shoes engage a surface under the machine (e.g., ground), transmitting torque from the sprocket to the surface, and thereby propel the machine relative to the surface.

Typically, a chain includes a plurality of track links that are coupled to each other for pivoting relative to an adjacent link. In some chains, a master link in the chain allows for disassembly of the chain to separate two ends of the chain so that the chain can be removed from the machine. A chain is removed from the machine to service components, such as the bushings, in order to extend the life of the chain.

This aforementioned chain works fairly well for moving the machine over rough ground that is challenging for wheeled vehicles, however, it has drawbacks. One drawback is that one side of the bushings wear due to contact with the sprocket and external elements. This side of the bushings predominantly wears out before other components. The other, unworn side of the bushings can then be used for the remaining half-life of the track. However, rotating the bushings to use the unworn side of the bushings requires significant cost, time and effort. Another drawback is that the chain must be removed from the machine and sent to a service center having specialized equipment to perform the bushing rotation.

There is a need for improvements in servicing chains, and in particular, the ability to service bushings, including rotating them more easily.

One attempt to address the issue of servicing track chains is described in U.S. Pat. No. 7,877,977 to Johannsen et al. and issued on Feb. 1, 2011. The '977 patent describes a master link for a chain that allows a chain to be more easily removed from a machine so that it can be sent to a service center for repair. While the '977 patent provides the ability to disconnect the ends of a chain more easily, the '977 patent fails to improve the ability to rotate the bushings.

Another attempt to address the issue of servicing track chains is described in U.S. Patent Publication No. 2018/0281880 to Trone et al. and issued on Oct. 4, 2018. The '880 publication describes another master track link that allows a chain to be more easily removed from a machine so that it can be sent to a service center for repair. Like the '977 patent, while the master track link provides the ability to disconnect the ends of a chain more easily, the '880 publication fails to improve the ability to rotate the bushings.

The present disclosure is directed to overcoming one or more of the shortcomings set forth above and/or other shortcomings in the art.

SUMMARY

In one aspect, the present disclosure relates to a method of servicing a track chain assembly including loosening a fastener to reduce a clamping force of a track link body on a track bushing. The method includes rotating the track bushing from a first position wherein a worn side of the track bushing faces a drive sprocket to a second position wherein an unworn side of the track bushing faces the drive sprocket. Once the bushing is rotated, the method includes tightening the fastener to increase the clamping force on the track bushing.

In another aspect, the present disclosure relates to a track chain assembly for a track machine including a plurality of track pins, a plurality of track bushings, a plurality of fasteners and a plurality of track links. Each of the plurality of track links is coupled to an adjacent track link by at least one of the plurality of track bushings and at least one of the plurality of track pins. Each of the plurality of track links includes a body defining a top surface, a bottom surface, a first side surface and a second side surface defining a thickness therebetween. The body extends from a first end to a second end. The body defines a first bore adjacent the first end and a second bore adjacent to the second end. The body also defines a first aperture and a second aperture, the first aperture disposed between the first bore and the second bore and nearer the first bore than the second bore. The first bore is configured to receive one of the plurality of track bushings and to apply a releasable clamp force on the one of the plurality of track bushings when a respective fastener of the plurality of fasteners is tightened.

The body further includes a first strut disposed between the first bore and the first aperture, the body defining a first gap dividing the first strut into a first upper portion and a first lower portion. The body further includes a second strut disposed between the first aperture and the second aperture, the body defining a second gap dividing the second strut into a second upper portion and a second lower portion.

In yet another aspect, the present disclosure relates to another method of servicing a track chain assembly including a plurality of track pins, a plurality of track bushings, a plurality of track links and a plurality of track shoe fasteners attaches a plurality of track shoes to the plurality of track links.

Each of the plurality of track links is connected to an adjacent track link by at least one of the plurality of track bushings and at least one of the plurality of track pins. Each of the plurality of track links includes a body defining a top surface, a bottom surface, a first side surface and a second side surface defining a thickness therebetween, the body extending from a first end to a second end. The body defines a first bore adjacent the first end and a second bore adjacent to the second end. The body also defines a first aperture and a second aperture, the first aperture disposed between the first bore and the second bore and nearer the first bore than the second bore.

The body further includes a first strut disposed between the first bore and the first aperture, and a first gap dividing the first strut into a first upper portion and a first lower portion. The body also includes a second strut disposed between the first aperture and the second aperture and a second gap dividing the second strut into a second upper portion and a second lower portion.

Each of the track pins is fixedly connected to the respective second bore, and each of the first bores is configured to receive the respective track bushing and apply a clamp force on the respective track bushing when the respective track shoe fastener is tightened to hold the track bushing in a first position.

The method of servicing the track chain assembly includes providing, receiving or manufacturing the above-described track chain assembly, loosening at least one of the track shoe fasteners, rotating the respective track bushing to a second position; and tightening the at least one track shoe fastener to retain the respective track bushing in the second position.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

DETAILED DESCRIPTION

Figure 1:
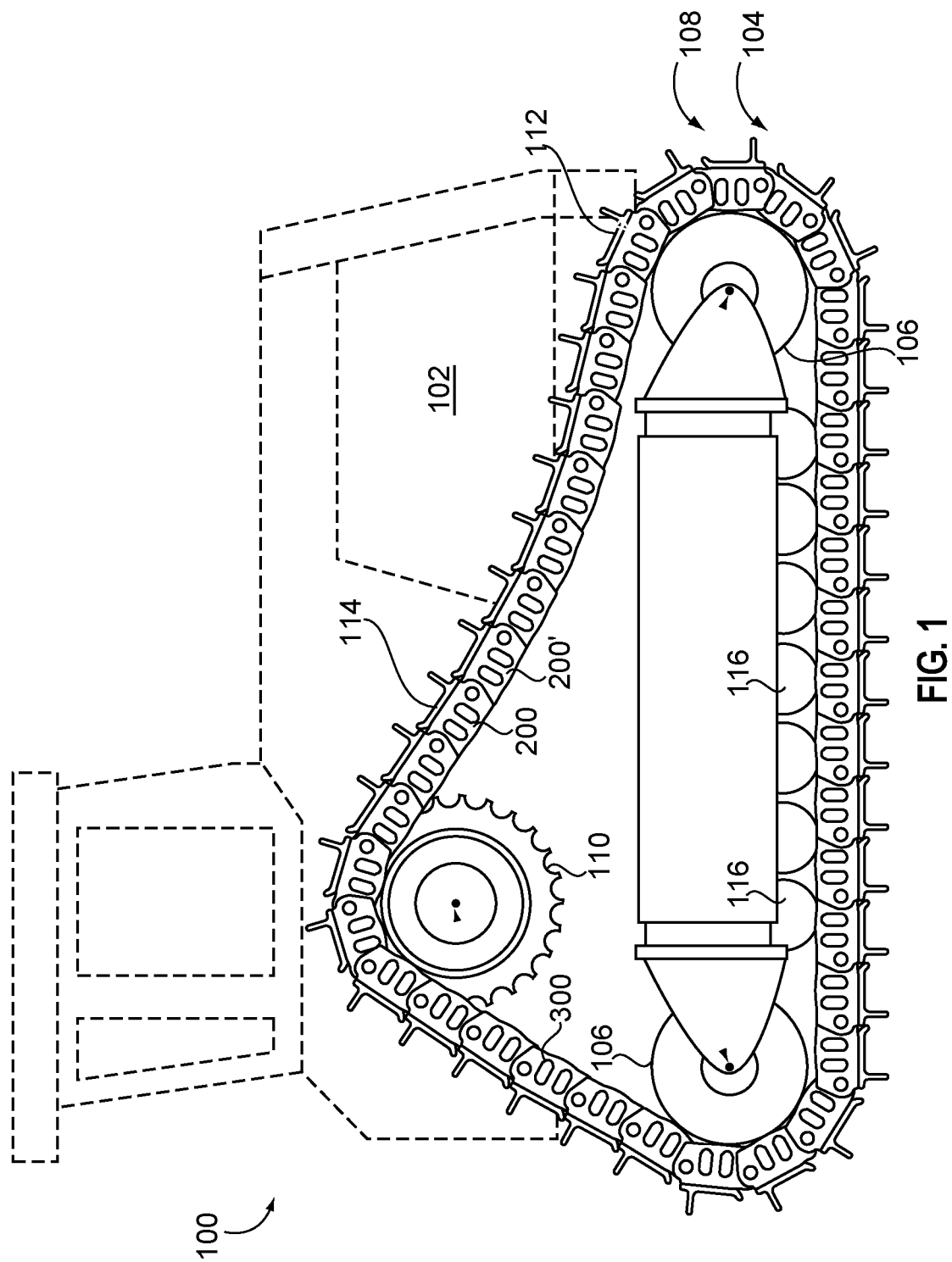
FIG. 1 is a side view of a machine that is driven by an illustrative track chain, in accordance with at least one example.

Reference will now be made in detail to embodiments of the disclosure, examples of which are illustrated in the accompanying drawings. The same reference numerals generally refer to the same or like components throughout the drawings. In some cases, a reference number will be indicated in this specification and the drawings will show the reference number followed by a prime for example, 100', 100" etc. It is to be understood that the use of primes or letters immediately after a reference number indicates that these features can be similarly shaped and have similar functions as is often the case when geometry is provided as a plurality of an element or is mirrored about a plane of symmetry. For ease of explanation in this specification, primes and letters may not be included herein but may be shown in the drawings to indicate duplications of features having similar or identical function or geometry, as shown and discussed within this disclosure.

In this disclosure, relative terms, such as, "substantially" are used to indicate a possible variation, for example, of ±10% in a stated numeric value. As defined herein, the use of the terms "or" or "and" includes "or", "and" or "and/or".

Various examples of a track chain and a method for servicing a track chain using track links that allow bushing rotation while the track chain remains in place on the machine, will now be described. In some examples, the track links may include offset track links.

Examples described in this disclosure enable customers to avoid a significant portion of the work required to rotate the bushings from the worn side to the unworn side and risks associated with disassembling and reassembling oil sealed components of a track chain. To facilitate rotation of the bushings, instead of press-fitting the bushing to the track link, which makes it difficult to service the bushings, the track links can include features to allow the bushing to be clamped by the track link during normal use. The clamp on the bushing can be loosened to perform a rotation of the bushing to an unworn side. Once the bushing is rotated, the bushing can be re-clamped in order to put the track chain back into use. The entire process can be performed without removing the track chain from the machine.

The solution described herein can include providing a clamp style track link that leverages the elastic nature of steel to clamp down on a bushing to keep it in place, but to also allow the clamping force to be eliminated or reduced enough to allow rotation of the bushing to a new position, and then the clamping force to be reapplied to hold the rotated bushing in the new position.

FIG. 1 illustrates an exemplary machine 100 having multiple systems and components that cooperate to accomplish a task. Machine 100 may embody a mobile machine that performs some type of operation associated with an industry such as mining, construction, farming, transportation, or any other industry known in the art. For example, machine 100 can be an earth moving machine such as an excavator, a dozer, a loader, a backhoe, a motor grader, or any other earth moving machine. Machine 100 can include a power source 102 and an undercarriage assembly 104, which may be driven by power source 102 and supported by one or more spaced-apart idler wheels 106.

Undercarriage assembly 104 can include two separate continuous tracks 108, one or more on either side of machine 100 (only one of which is shown in FIG. 1). Each track 108 can be driven by power source 102 via one or more drive sprockets 110. In addition, each track 108 may include a track chain 112 (hereinafter chain 112) and a plurality of track shoes 114, each track shoe 114 configured to selectively engage a surface (e.g., the ground). Support rollers 116 can be provided at the bottom of the track 108 to support the chain 112. Each chain 112 can include a plurality of link subassemblies 200 and, in some examples, a master link subassembly 300 to separate or connect two link subassemblies 200 of the chain 112 in order to facilitate attachment or removal of the chain 112 to and from machine 100.

Figure 2:
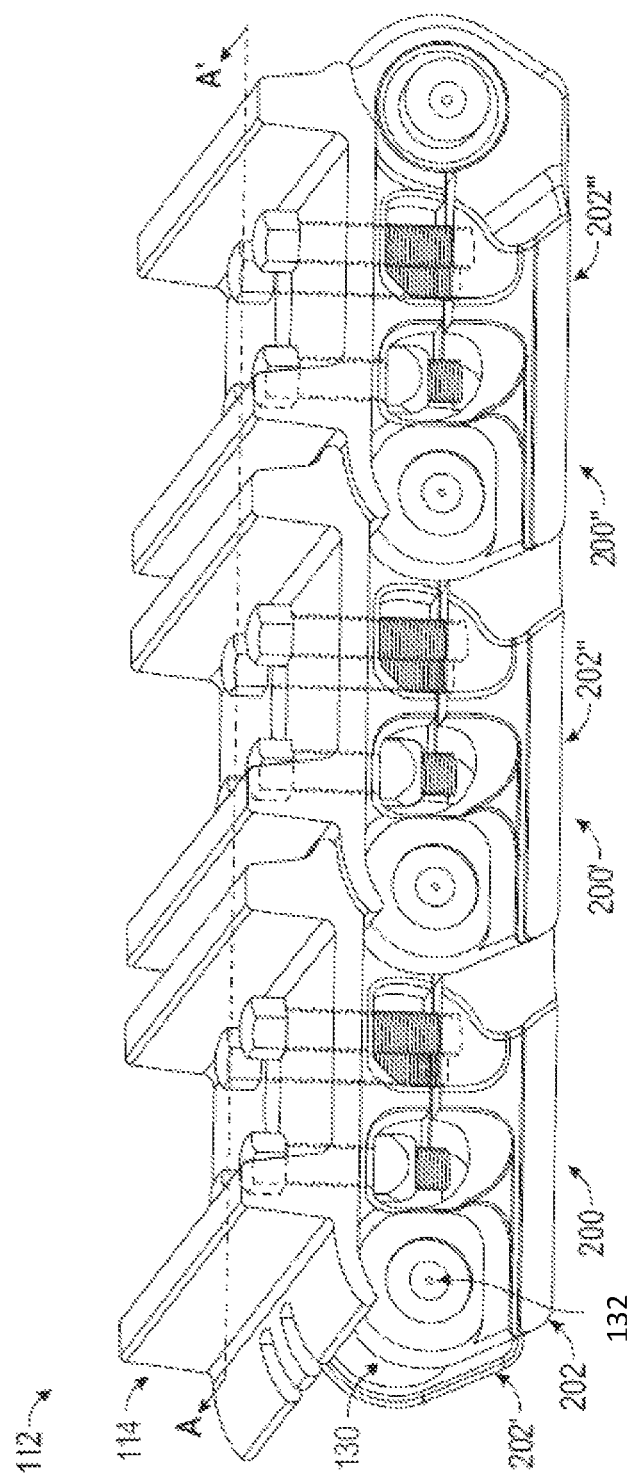
FIG. 2 is a perspective view of a portion of the track chain of the machine of FIG. 1, in accordance with at least one example.
Figure 3:
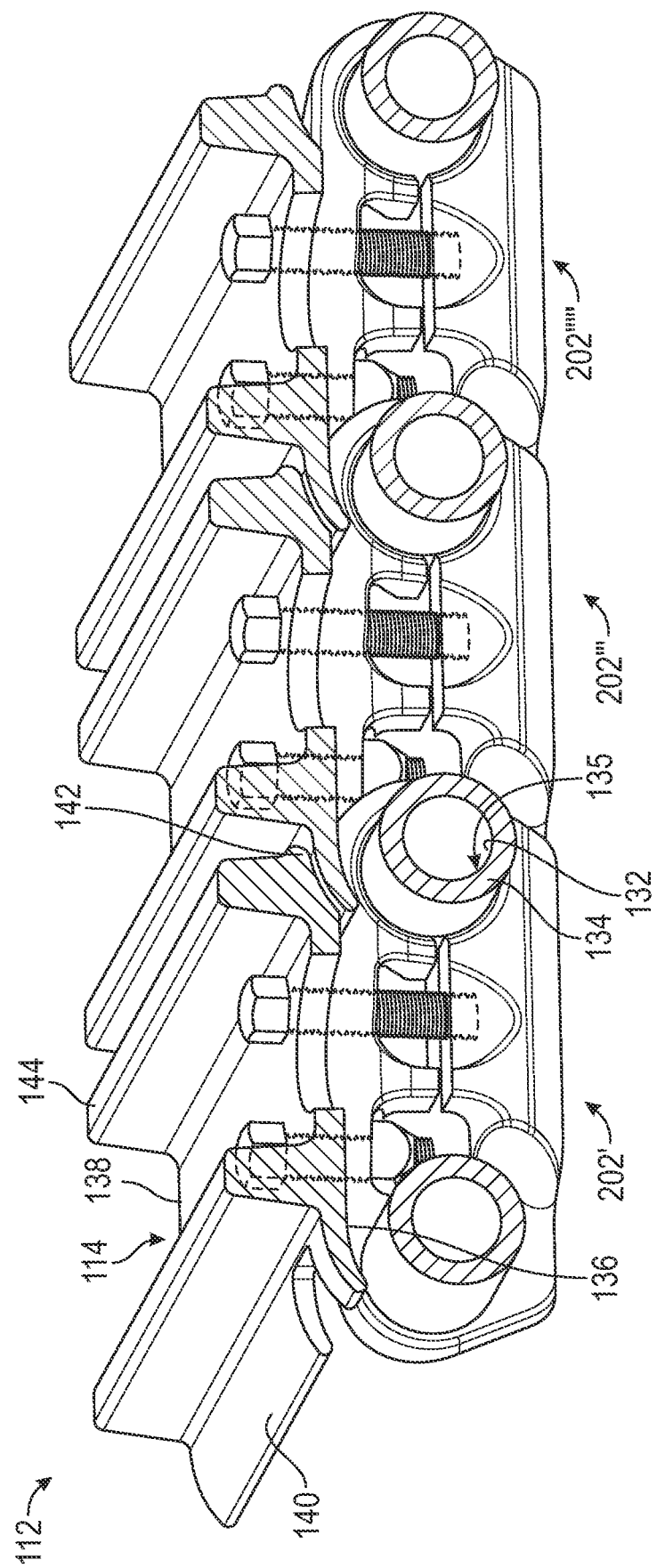
FIG. 3 is a cross-section view of the perspective view of FIG. 2 taken along line A-A', in accordance with at least one example.
Figure 4:
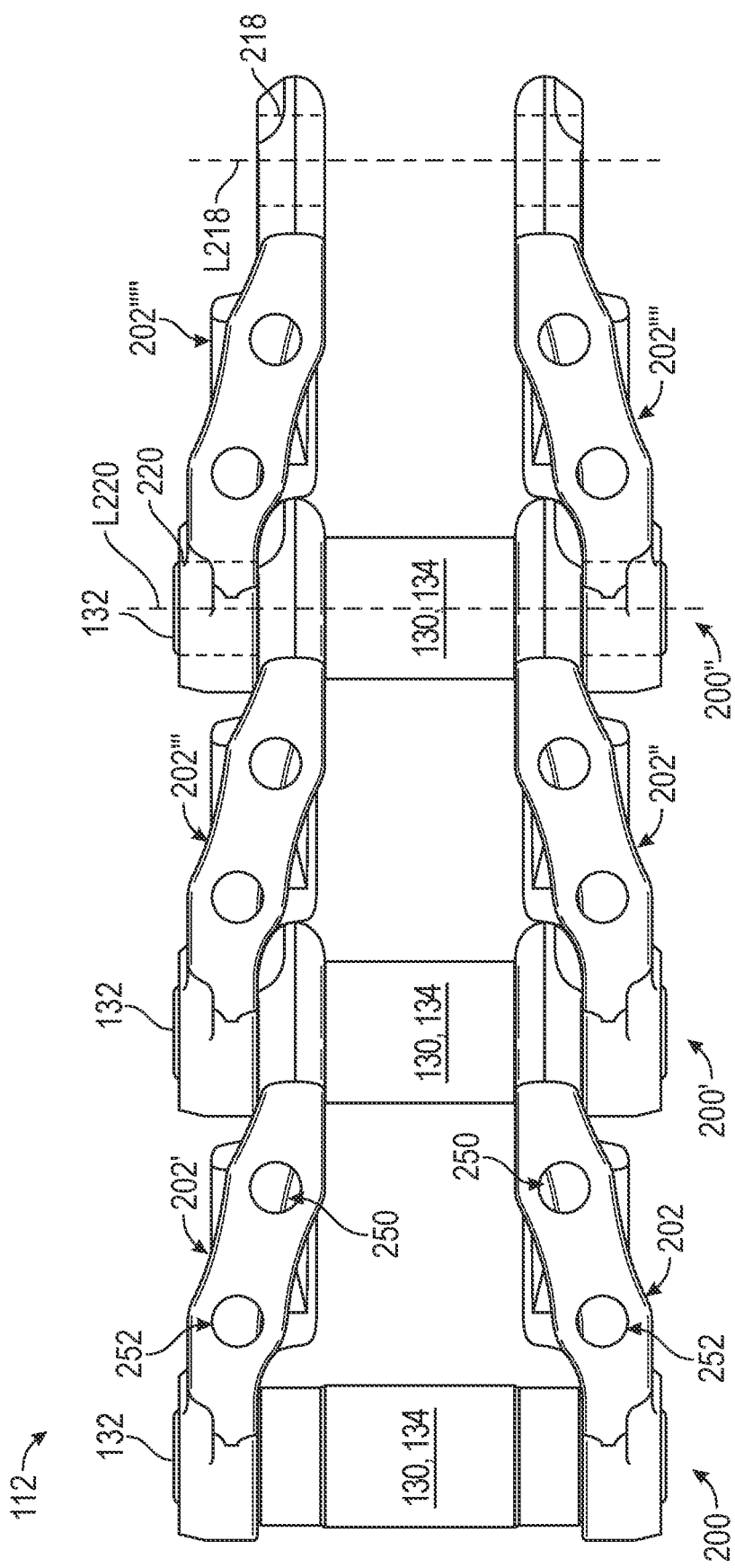
FIG. 4 is a top view of a portion of the track chain of FIG. 2, in accordance with at least one example.

FIGS. 2-4 illustrate various views of a portion of the example chain 112 of the machine 100 of FIG. 1. Together the various views help understand the individual components that make up the chain and how those components work together to form an endless track. In particular, FIG. 2 illustrates a perspective view of a portion of the chain 112 and FIG. 3 illustrates a cross-section of the perspective view of FIG. 2 taken along line A-A'. FIG. 4 illustrates a top view of the portion of the chain 112 shown in FIG. 2, FIG. 5 illustrates in further detail, a side view of some of the components that make up the building blocks of the chain, including an example track link 202 having a body 204, and a track shoe 114.

As shown in FIGS. 2 and 4, the chain 112 can include a plurality of link subassemblies 200 (e.g., 200, 200', 200", etc.). However, in the top view of FIG. 4, the track shoes 114 are removed in order to better view the link subassemblies 200. Each one of the link subassemblies 200 can include a respective pair of offset track links 202 (e.g., 202, 202'; 202", 202'"; 202"", 202'"").

As shown in FIG. 2, adjacent link subassemblies e.g., 200, 200' may be interconnected via rod assemblies 130 to form the chain 112. As further shown in FIGS. 3 and 4, each rod assembly 130 can include a substantially cylindrical bushing 134 disposed about a substantially cylindrical pin 132.

Figure 5:
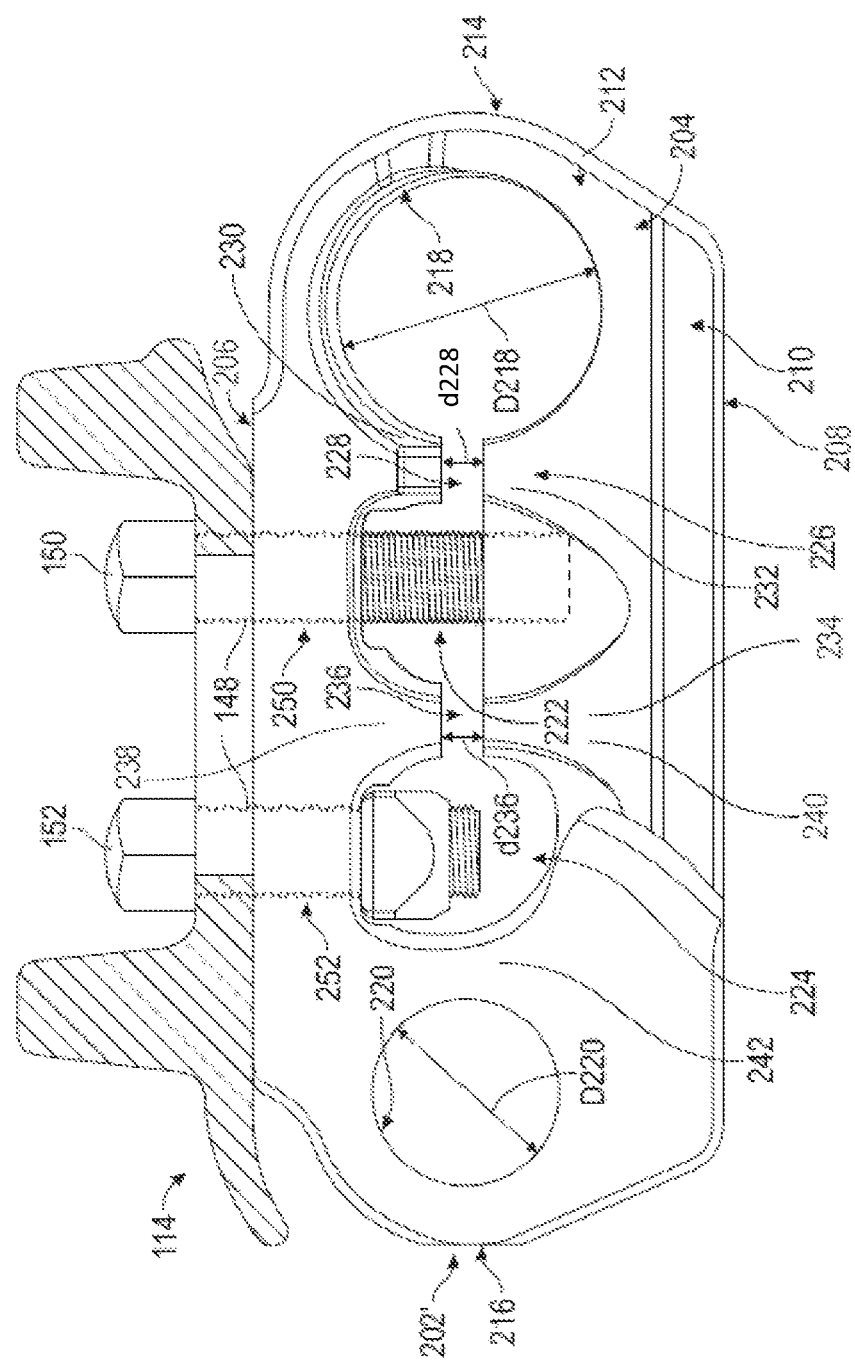
FIG. 5 is a side view of a track link of the track chain assembly of FIG. 2, in accordance with at least one example.

FIGS. 4 and 5 show how each rod assembly 130 can interface with first and second bores 218, 220 in track links 202, 202'; 202", 202'", such that consecutively connected link subassemblies 200 may be pivotally interconnected relative to each other and pivot relative to one another. For example, the link subassembly 200 can be pivotably coupled to another link subassembly 200', and this arrangement is repeated until the chain 112 is completed.

With continued reference to FIGS. 4 and 5, in some examples, to provide the pivotal connection between two adjacent link subassemblies 200, 200', the bushing 134 can be coupled to the first pair of track links 202, 202' (hereinafter link) in a releasable manner within the first bore 218, such as when a clamp fit is employed. With the bushing 134 fixedly coupled to the first pair of links 202, 202', the pin 132 can be fixedly coupled to the second pair of links 202", 202'" at the second bore 220, The fixed coupling can include, for example, a press-fit coupling. In this arrangement, the pin 132 can be disposed within the bushing 134 and the pin 132 can be free to rotate within the bushing 134 due to a clearance provided between the pin 132 and a bore 135 of the bushing 134 (bore 135 illustrated in FIG. 3). As a result, the pair of adjacent link subassemblies 200, 200' may be configured to pivot with respect to one another to form the articulating chain 112.

Similarly, in examples where a master track link 300 is provided (FIG. 1), the master track link subassembly 300 may disposed between and connected between two link subassemblies 200, 200' by way of the example rod assemblies 130, or any other suitable other rod assemblies. One or more master track link subassemblies 300 can include features that facilitate easier attachment and removal of the chain 112 from the machine 100 than if the chain 112 were made entirely of the plurality of link subassemblies 200.

To transfer motion from the chain 112 to the ground, a track shoe 114 can be coupled to the links 202, 202' etc. As shown in Ha 3, each track shoe 114 can include a base portion 136, a ground-engaging surface 138, a leading edge 140, and a trailing edge 142. One or more grousers or ribs 144 can be provided to engage the ground, improving traction.

As shown in FIG. 4 (and in further detail in FIG. 5), each link 202 can include one or more fastener receiving holes 250, 252 such as a clearance or threaded hole configured to receive a fastener (e.g., a bolt or screw), to attach the track shoe 114 (FIGS. 2, 3 and 5) to a given one of link subassemblies 200.

FIG. 5 illustrates a side view of one of the links 202', a portion of the track shoe 114 and fasteners 150, 152 of the chain 112 of FIG. 2. In some examples, each link 202' can include a body 204 defining a top surface 206, a bottom surface 208, a first side surface 210 and a second side surface 212 defining a thickness therebetween, a first end 214 and a second end 216. The body 204 can also define a first bore 218 adjacent the first end 214 and a second bore 220 adjacent the second end 216. The first and second bores 218, 220 can extend from or be at least partially defined by either or both side surface 210, 212. As shown, the bores 218, 220 are cylindrical but may have any other suitable configuration.

The body 204 can include a first aperture 222 disposed between the first bore 218 and the second bore 220, the first aperture 222 being disposed nearer the first bore 218 than the second bore 220. Similarly, the body 204 can further define a second aperture 224 disposed between the first aperture 222 and the second bore 220. The first and second apertures 222, 224 can extend from the first side surface 210 completely through the body to the second side surface 212.

As a result of the placement of the first and second bores 218, 220 and the first and second apertures 222, 224, the body 204 can include a first strut 226 disposed between the first aperture 222 and the first bore 218 and a second strut 234 between the first and second apertures 222, 224. A first gap 228 can be provided to divide the first strut 226 into a first upper portion 230 and a first lower portion 232. Likewise, a second gap 236 can be provided to divide the second strut 234 into a second upper portion 238 and a second lower portion 240.

Both the first and second gaps 228, 236 can extend completely through the body 204 from the first side surface 210 to the second side surface, providing flexibility to the body 204, as is described in further detail herein. The body 204 can include a bridge 242 disposed between the second aperture 224 and the second bore 220. This bridge 242, which may also be referred to as a third strut, a unitary strut or an undivided strut, provides the requisite rigidity near the second bore 220 of the link 202'.

In the examples of FIGS. 2-5, the links 202 are offset track links 202. Offset describes a jog in the shape of the link 202. For example, as labeled in link 202'"" of FIG. 4, the first bore 218 defines a first longitudinal axis L218 and the second bore 220 defines a second longitudinal axis L220, and the body 204 jogs, forming an offset track link 202'"" such that the first bore 218 and the second bore 220 are offset or spaced away from each other along either the first or second longitudinal axis L218, L220. Other configurations are possible for the links, including a straight link configuration, without departing from the scope of this disclosure. In other examples that include straight track links instead of offset track links, a respective pair of inner and outer track links can be provided in place of a respective pair of offset track links.

As shown in FIG. 5, each track shoe 114 can include two pairs of shoe holes 148 for receiving fasteners 150, 152. Each pair of shoe holes 148 can be configured to align with a pair of fastener receiving holes 250, 252. In some examples, shoe holes 148 and fastener receiving holes 250, 252 can be clearance holes threaded holes, or any combination of clearance and threaded holes.

Each track shoe 114 can be respectively connect to an opposing pair of track links e.g. 202, 202'. Threaded fasteners 150, 152, such as bolts or cap screws, may be disposed in each shoe hole 148 and extend into fastener receiving holes 250, 252 to fasten a track shoe 114 to a respective pair of opposing offset link members (e.g., 202, 202'). In some examples, the spacing of the fastener receiving holes 250, 252 for each link 202, 202', etc. can be substantially similar such that each track shoe 114 can be configured to be connectable to each of link 202, 202', etc., and each track shoe 114 can be similarly or identically configured.

In some examples, the first bore 218 defines a first diameter D218 and the second bore 220 defines a second diameter D220. The first diameter can be configured to mate with a bushing 134 and the second diameter D220 can be configured to mate with a pin 132. As shown in the example, the first diameter can be larger than the second diameter.

With regard to the clamping action that enables the clamp fit of the bushing 134 within the first bore 218, the size of the first and second gaps 228, 236 contribute to the clamping force applied. For example, the first gap 228 defines a first minimum distance d228 and the second gap 236 defines a second minimum distance d236. Furthermore, the ratio of the second minimum distance d236 to the first minimum distance d228 may range from 3 to 10. In some instances, this ratio may range from 6 to 7. Exemplary values of the first minimum distance d228 versus the second minimum distance d236 are 0.75 mm to 5 mm respectively. The value of this ratio or the distances can be varied as needed or desired in other examples.

Fasteners such as a first track shoe fastener 150 and a second track shoe fastener 152 can be used to control the size of the first and second gaps 228, 236 by controlling the amount of the clamping force applied to the bushing 134. As shown in FIG. 4, a first fastener receiving hole 250 in communication with the first aperture 222 or a second fastener receiving hole 252 in communication with the second aperture 224 can be provided in the body 204 to receive fasteners 150, 152, such as track shoe fasteners. The torque on the fasteners 150, 152 can be adjusted to control the clamping force applied to the bushing 134. In the example, the fasteners 150, 152 are shown as track shoe fasteners, but in some examples, the fasteners may include fasteners other than track shoe fasteners. In some examples the fasteners 150, 152 can be a single fastener and/or the fastener(s) 150, 152 can be arranged such that the fastener is dedicated to clamping the bushing 134 and not be configured to also attach the track shoes 114.

In some examples, the first fastener receiving hole 250 can include a portion above the first aperture 222 that is a clearance hole, and a portion below the first aperture 222 that is a threaded hole to receive the first fastener 150. In some examples, the second fastener receiving hole 252 can include a portion above the second aperture 224 that is a clearance hole, and a weldnut having threads mounted in the second aperture 224 to receive and secure the second fastener 152. FIG. 5 represents merely one example of fasteners 150, 152 for inducing a clamping force on the bushing 134. Other arrangements of fasteners 150, 152 and interfaces with the link 202 can induce a suitable clamping force on the bushing 134.

Figure 6:
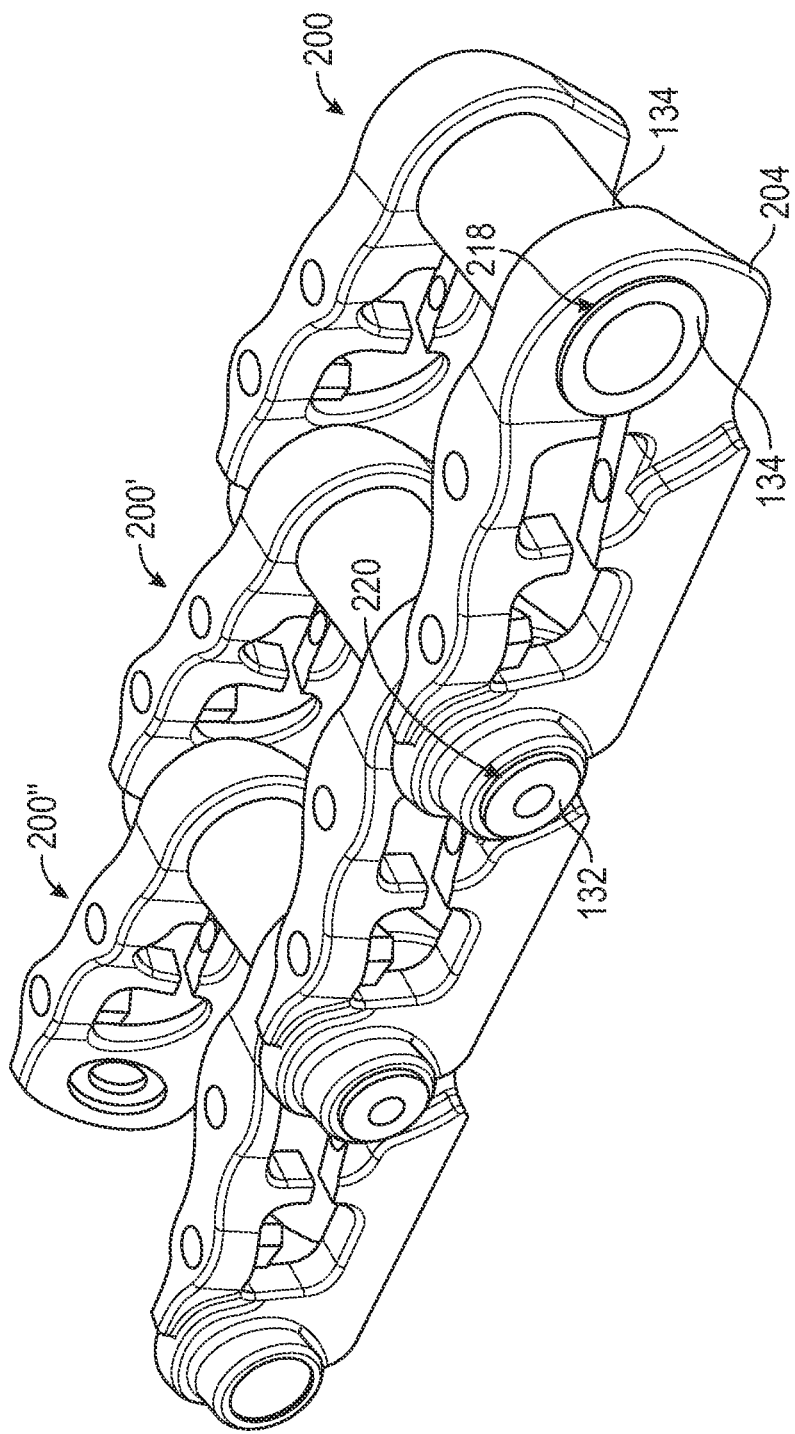
FIG. 6 is a perspective view of a portion of the track chain of the machine of FIG. 2 in an assembled state, in accordance with at least one example.
Figure 7:
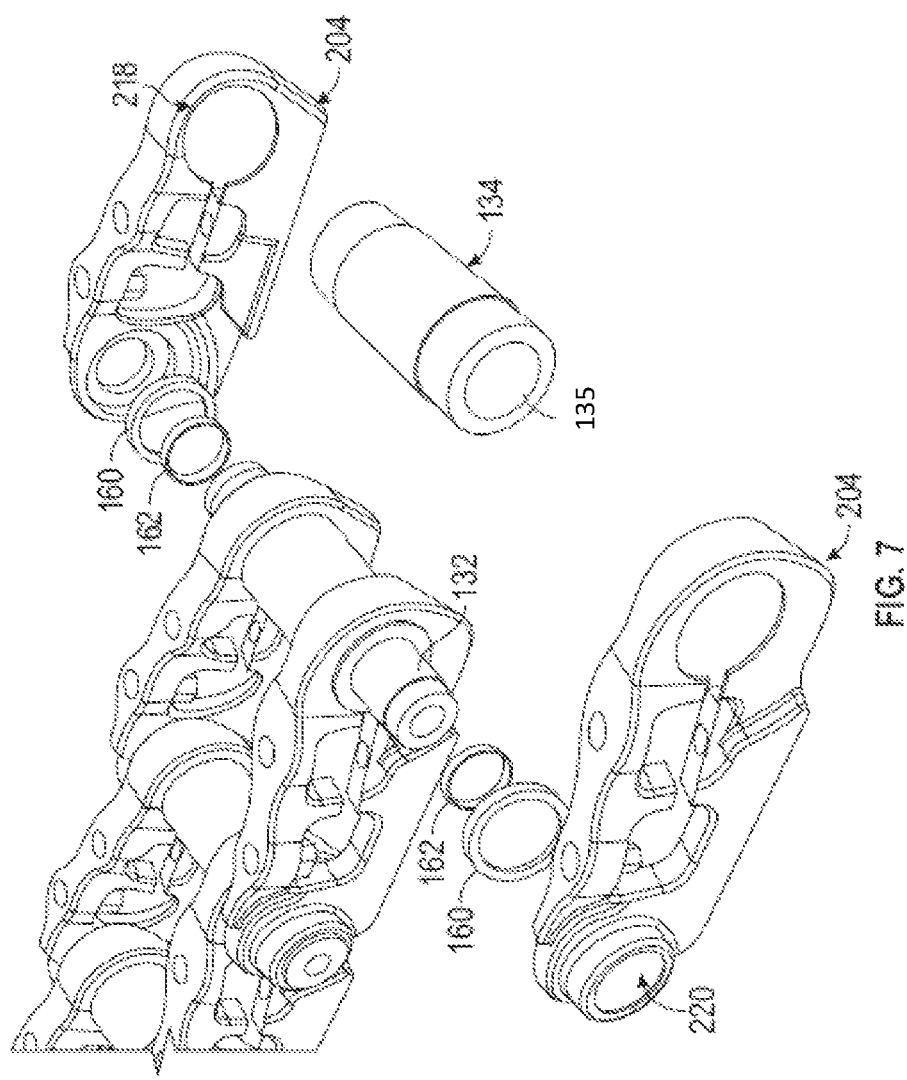
FIG. 7 is a perspective view of a portion of the track chain of FIG. 2 in a partially exploded view, in accordance with at least one example.

Individual links 202, such as link 202' described with respect to FIG. 5, are coupled together into the link subassemblies 200 to form the chain 112. FIG. 6 further illustrates a perspective view of a portion of the chain 112 of the machine 100 of FIG. 2 in an assembled state. FIG. 7 illustrates a perspective view of a portion of the chain 112 of FIG. 2 in a partially exploded view. The track shoes 114 are removed in FIG. 6 and FIG. 7 so that features of the links 202 can be seen more clearly.

As shown in FIG. 6, the chain 112 includes a plurality of link subassemblies 200, 200', 200" that are connected to each other by bushings 134 disposed about respective pins 132. For example, in the chain 112 of FIG. 6, bushing 134 is clamped within the first bore 218 in a fixed relationship with the body 204, and pin 132 is press-fit within the second bore 220 in a fixed relationship with the body 204.

FIG. 7 shows the exploded view of the chain of FIG. 6. Assembly of the chain 112 usually occurs at the manufacturer. During assembly, a first bushing 134 can be clamped within first bores 218 of a first set of opposing offset track links (e.g., 202, 202', hereinafter a first set of links 202, 202'). Second bore 220 of a second set of opposing offset track links (e.g., 202", 202''', hereinafter a second set of links 202", 202''') are aligned coaxially with the first bores 218 of the first set of links 202, 202'. A pin 132 is inserted through the second bore 220 of the second set of links 202, 202' and the bushing 134 of the first set of links 202, 202'. The pin 132 is coupled to the second set of links 202", 202''' in a fixed relationship, such as by press-fitting. A clearance can be provided between the pin 132 and the bushing 134 to facilitate relative movement between the pin 132 and the bushing 134.

To facilitate smooth movement between the pin 132 and the bushing 134, bearings 160 and seals 162 can be included in the articulating joint. A pair of bearings 160 (FIG. 7) that are freely rotatable relative to pin 132, and a pair of seals 162 (FIG. 7) may also be provided to prevent the loss of lubrication and provide freedom of movement. In some examples, the bearings 160 and seals 162 may be combined functionally in the same assembly and incorporated into either the rod assembly 130 or the links 202, 202'. In some examples the bearings 160 and seals 162 create an oil sealed joint (FIG. 7).

When the desired number of link subassemblies 202 have been coupled together to achieve the desired length of the chain 112, ends of the chain 112 can be connected to one another to form an endless drive, such as the chain 112 shown in FIG. 1.

Figure 8:
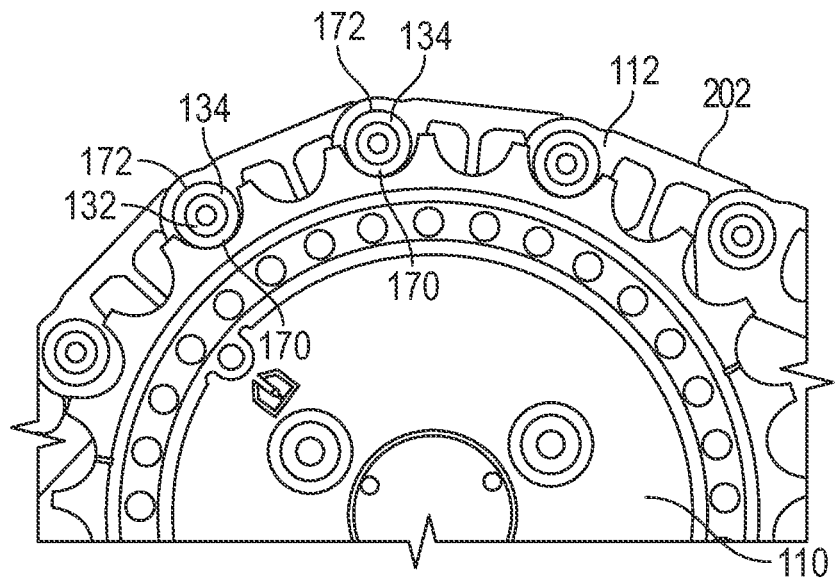
FIG. 8 is a side view of a portion of the track chain of FIG. 2 interfacing with a drive sprocket, in accordance with at least one example.

FIG. 8 illustrates a side view of a portion of the chain 112 of FIG. 2 interfacing with a drive sprocket 110. In FIG. 8, the track shoes 114 and half of the links 202 are removed to allow the drive sprocket 110 to be viewed in greater detail. FIG. 8 also depicts the difference between the first side 170 (e.g., worn side) of the bushing 134 versus the second side 172 (e.g., unworn side) of the bushing 134. When a machine 100 (FIG. 1) is new and is initially put into service, the bushing 134 can be oriented in a first position (as shown). As the machine 100 is driven, the first side 170 of the bushing 134 becomes worn by contact with the drive sprocket 110. By rotating the bushing 134 to the second position such that the second side 172 that is unworn, now interfaces with the sprocket 110, the life of the chain 112 can be extended. In some examples rotating the bushing 134 from the first position to the second position can include rotating the bushing 180 degrees (e.g., approximately 180 degrees).

INDUSTRIAL APPLICABILITY

In general, the foregoing disclosure finds utility in various industrial applications, such as, in track type machines 100. The chain 112 described herein may provide for improved serviceability of bushings 134 such that a bushing 134 can be rotated to use an unworn side 172 without removing the chain 112 from the machine 100. The improved serviceability including rotation of the bushings 134 will now be described.

Figure 9:
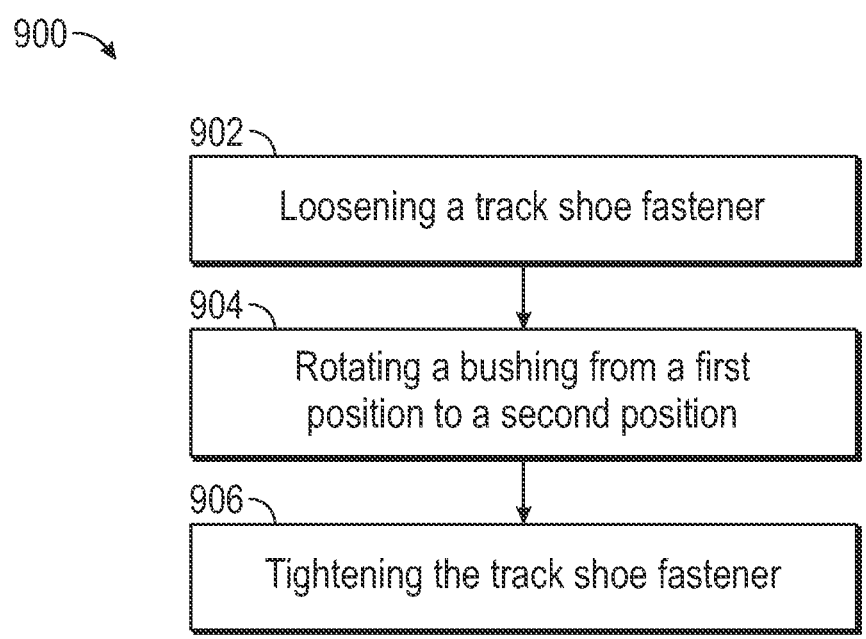
FIG. 9 is an illustrative method of servicing the track chain of FIGS. 1-8.

FIG. 9 illustrates a method 900 of servicing the chain of FIGS. 1-8. In practice, a chain 112 assembly, such as the examples described herein may be sold, bought, manufactured or otherwise obtained, in part or in whole, in an original equipment manufacturer (OEM) or after-market context.

A chain 112, such as shown and described previously with respect to FIG. 1 can be assembled at the factory and installed on a machine 100 or sold as a replacement part and installed on the machine 100. Over time and with use, parts of the chain 112 can become worn or damaged and may need to be replaced or adjusted. In particular, bushings 134 of a chain 112 may need to be replaced. In some cases, instead of replacing a bushing 134, the bushing 134 can be rotated 180 degrees in order to utilize an unworn half of the bushing 134. An unworn half of a bushing (e.g., 172) can include the half of the bushing 134 that has not been in contact with the sprocket 110. Normally, in order to rotate the bushings 134 a number of steps are required to service the bushing 134. The steps taken currently to rotate bushings 134 on a chain 112 assembly include: 1) removing the chain 112 from the machine 100; 2) shipping the chain 112 to the nearest dealer shop that has a capable disassembly/reassembly track press; 3) disassembling all components, rotating the bushings 134, reassembly and the oiling sealed joints; and 4) shipping the chain 112 back to the customer for reinstallation on the machine 100. This is an expensive and time-consuming process. To eliminate the need to remove a chain 112 from the machine 100 when rotating the bushings 134, a chain 112 according to the examples of FIGS. 1-8 can be provided.

The method 900 of servicing a chain 112, such as rotating bushings 134, can be performed while the chain 112 remains positioned on an undercarriage 104 of the machine 100. The example method 900 is described with respect to the chain 112 remaining positioned on an undercarriage 104 of the machine 100 and the link subassemblies 200, 200' being continuously connected in an endless drive arrangement (e.g., FIG. 1). In other words, while the chain 112 remains coupled to a drive sprocket 110 and other undercarriage components 104 of the track machine 100. However, in some examples, the method 900 could also be performed including a step of removing the chain 112 from the machine 100, rotating the bushings 134, and then re-installing the chain 112 on the machine. Although this removal and re-installation is beneficially made unnecessary by the chain 112 design of FIGS. 1-8.

The method 900 enables customers to avoid a significant portion of the work required to turn the bushings 134 from the worn side (e.g., 170) to the unworn side (e.g., 172), and all the risks associated with disassembling and reassembling oil sealed components.

According to method 900, to rotate one or more bushings 134 disposed in one or more first bores 118 (while the chain 112 assembly remains on a machine 100), step 902 can include loosening a track shoe fastener (e.g., 150, 152) to release a clamping force induced by a first bore 118 of a track link body 204 on the bushing 134. Loosening the track shoe fastener 150 in step 902 can cause a first gap 228 in a first strut 226 located adjacent to the first bore 218, to be increased. In some examples, step 902 can also include loosening the track shoe fastener 152 to cause a second gap 236 in a second strut 234 to be increased.

Step 904 can include rotating the bushing 134 from a first position (FIG. 8) to a second position (180 degrees rotated from FIG. 8), while the bushing remains disposed inside of the first bore 218. In the first position, a worn side 170 of the of the bushing 134 can face the drive sprocket 110. The worn side 170 can be referred to as a first half, or approximately 180 degrees of the bushing 134. In the second position, an unworn side 172 of the bushing 134 can face the drive sprocket 110. The unworn side 172 can be referred to as a second half, or approximately the remaining 180 degrees of the bushing 134.

Step 906 can include tightening (e.g., re-tightening) the track shoe fastener 150, 152 to create (e.g., induce, re-create) a clamping force on the bushing 134. Tightening one or more of the track shoe fasteners 150, 152 in step 906 can cause the first gap 228 in the first strut 226 located adjacent to the first bore 218, to be reduced. Reduction of the first gap 228 causes the first bore 218 to contract and clamp against the bushing 134. The second gap 236 can also be reduced by this process. With the bushing 134 clamped in place and restricted from rotation, the chain 112 is ready to be put back into use with a new bushing 134 surface (e.g., unworn side) configured to interface with a drive sprocket 110. This method 900 can be repeated for each of the link subassemblies 200.

In some examples, the method 900 can be performed while a pin 132 that is disposed within the bushing 134 remains fixedly connected to a track link body 204 of the chain 112. In some examples, the method 900 can be performed while bearings 160 and seals 162 that facilitate relative movement between the bushing 134 and the pin 132 remain coupled to the track link body 204, and without breaking the sealed joint (e.g., oil sealed joint) that retains the bearings 160 in place.

It will be apparent to those skilled in the art that various modifications and variations can be made to the disclosed snow blower machine. Other embodiments will be apparent to those skilled in the art from consideration of the specification and the practice of the disclosed machine. It is intended that the specification and examples be considered as exemplary only, with a true scope being indicated by the claims and their equivalents.

What is claimed is:

1. A method of servicing a track chain assembly, the method comprising:
   reducing a clamping force of a track link on a bushing arranged at a first end of the track link by loosening a fastener while maintaining a press-fit of the track link with a track pin at a second end of the track link;
   rotating the track bushing from a first position wherein a worn side of the track bushing faces a drive sprocket to a second position wherein an unworn side of the track bushing faces the drive sprocket;
   tightening the fastener to increase the clamping force on the track bushing.

2. The method of claim 1, wherein the method is performed while the track chain assembly remains coupled to a drive system of a track machine.

3. The method of claim 1, wherein tightening the fastener causes a first gap in a first strut located adjacent to a first bore to be reduced, and wherein at least portion of the track bushing is disposed in the first bore.

4. The method of claim 1, wherein a track pin that disposed within the track bushing remains fixedly connected to the track link body while the method is performed.

5. The method of claim 1, wherein the fastener is a track shoe fastener configured to attach a track shoe to the track link body.

6. The method of claim 1, wherein the method is performed without exposing an oil sealed joint including bearings that facilitate relative movement between the track bushing and track pin.

7. A track chain assembly comprising:
   a plurality of track pins and a plurality of track bushings;
   a plurality of fasteners; and a plurality of track links, wherein each of the plurality of track links is coupled to an adjacent track link by at least one of the plurality of track bushings and at least one of the plurality of track pins, each of the plurality of track links comprising:

a body defining a top surface, a bottom surface, a first side surface and a second side surface defining a thickness therebetween, the body extending from a first end to a second end, wherein the body defines a first bore adjacent the first end and a second bore adjacent to the second end;

the body defines a first aperture and a second aperture, the first aperture disposed between the first bore and the second bore, the first aperture being disposed nearer the first bore than the second bore, wherein the first bore is configured to receive one of the plurality of track bushings and to apply a releasable clamp force on the one of the plurality of track bushings when a respective fastener of the plurality of fasteners is tightened;

the body includes a first strut disposed between the first bore and the first aperture, the body defining a first gap dividing the first strut into a first upper portion and a first lower portion;

the body includes a second strut disposed between the first aperture and the second aperture, the body defining a second gap dividing the second strut into a second upper portion and a second lower portion; and the body includes a bridge member between the second aperture and the second bore and the second bore is adapted for a press-fit with the at least one of the plurality of track pins, wherein each track pin is fixedly coupled to a respective second bore, and wherein each track pin is disposed within a respective track bushing.

8. The track chain assembly of claim 7, wherein when each of the fasteners is tightened the respective first gap is reduced.

9. The track chain assembly of claim 7, wherein each of the plurality of track bushings is configured to be rotated without removing the track chain assembly from a machine when the respective track shoe fastener is loosened causing the clamp force on the track bushing to be reduced.

10. The track chain assembly of claim 7, wherein each first bore defines a first longitudinal axis and each second bore defines a second longitudinal axis and each body jogs, forming offset track links such that the first bore and the second bore are offset from each other along the first or second longitudinal axis.

11. The track chain assembly of claim 7, further comprising a master track link that is different from the plurality of track links, wherein the master track link is configured to separate or connect two of the plurality of track links to attach or remove the track chain assembly from an undercarriage of a track machine.

12. The track chain assembly of claim 7, wherein the plurality of fasteners include a plurality of track shoe fasteners arranged to attach a plurality of track shoes to the plurality of track links.

13. The track chain assembly of claim 7, wherein each body includes a first fastener receiving hole configured to receive one of the plurality of track shoe fasteners into the respective first aperture, and wherein the first fastener receiving hole includes a clearance hole in the first upper portion and a threaded hole in the first lower portion.

14. A track chain assembly comprising:
a plurality of track pins and a plurality of track bushings;
a plurality of fasteners; and
a plurality of track links, wherein each of the plurality of track links is coupled to an adjacent track link by at least one of the plurality of track bushings and at least one of the plurality of track pins, each of the plurality of track links comprising:

a body defining a top surface, a bottom surface, a first side surface and a second side surface defining a thickness therebetween, the body extending from a first end to a second end, wherein the body defines a first bore adjacent the first end and a second bore adjacent to the second end;

the body defines a first aperture and a second aperture, the first aperture disposed between the first bore and the second bore, the first aperture being disposed nearer the first bore than the second bore, wherein the first bore is configured to receive one of the plurality of track bushings and to apply a releasable clamp force on the one of the plurality of track bushings when a respective fastener of the plurality of fasteners is tightened;

the body includes a first strut disposed between the first bore and the first aperture, the body defining a first gap dividing the first strut into a first upper portion and a first lower portion;

the body includes a second strut disposed between the first aperture and the second aperture, the body defining a second gap dividing the second strut into a second upper portion and a second lower portion; and the body includes a bridge member between the second aperture and the second bore and the second bore is adapted for a press-fit with the at least one of the plurality of track pins, wherein all of the plurality of track links that form the track chain assembly are the same, and wherein the track chain assembly is an endless drive.

15. The track chain assembly of claim 14, wherein when each of the fasteners is tightened the respective first gap is reduced.

16. The track chain assembly of claim 14, wherein each of the plurality of track bushings is configured to be rotated without removing the track chain assembly from a machine when the respective track shoe fastener is loosened causing the clamp force on the track bushing to be reduced.

17. The track chain assembly of claim 14, wherein each first bore defines a first longitudinal axis and each second bore defines a second longitudinal axis and each body jogs, forming offset track links such that the first bore and the second bore are offset from each other along the first or second longitudinal axis.

18. The track chain assembly of claim 14, further comprising a master track link that is different from the plurality of track links, wherein the master track link is configured to separate or connect two of the plurality of track links to attach or remove the track chain assembly from an undercarriage of a track machine.

19. The track chain assembly of claim 14, wherein the plurality of fasteners include a plurality of track shoe fasteners arranged to attach a plurality of track shoes to the plurality of track links.

20. The track chain assembly of claim 14, wherein each body includes a first fastener receiving hole configured to receive one of the plurality of track shoe fasteners into the respective first aperture, and wherein the first fastener receiving hole includes a clearance hole in the first upper portion and a threaded hole in the first lower portion.

* * * * *